United States Patent [19]

Adams

[11] 4,222,338
[45] Sep. 16, 1980

[54] LININGS FOR FURNACES

[75] Inventor: Albert E. Adams, Stoke-on-Trent, England

[73] Assignee: Combustion Linings Limited, Staffordshire, England

[21] Appl. No.: 951,992

[22] Filed: Oct. 16, 1978

[30] Foreign Application Priority Data

Oct. 18, 1977 [GB] United Kingdom ............... 43220/77

[51] Int. Cl.³ .............................................. F23M 5/00
[52] U.S. Cl. ...................................... 110/336; 52/506
[58] Field of Search .................. 110/336; 52/404, 506, 52/509, 227

[56] References Cited

U.S. PATENT DOCUMENTS

| | | | |
|---|---|---|---|
| 3,832,815 | 9/1974 | Balaz et al. ....................... | 110/336 X |
| 3,854,262 | 12/1974 | Brady ................................. | 110/336 X |
| 3,892,396 | 7/1975 | Monaghan ........................ | 110/336 X |

Primary Examiner—Edward G. Favors
Attorney, Agent, or Firm—Marshall & Yeasting

[57] ABSTRACT

A method of a ceramic fibre lining to a furnace comprises forming strips of fibre by making transverse cuts through a ceramic fibre blanket in which the axes of the fibres are substantially parallel to the longitudinal axis of the blanket, said cuts being made at an acute angle to the major faces of the blanket, and arranging the strips on the furnace wall to be lined with a thus cut face against the said wall. The invention provides also furnaces lined according to said method and prefabricated lining modules having a backing and a lining made according to said method.

25 Claims, 12 Drawing Figures

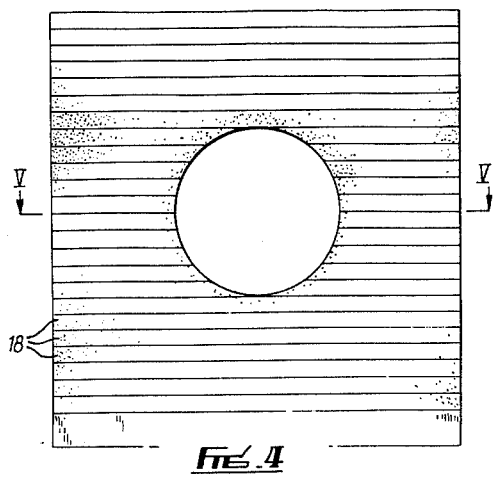
FIG. 4
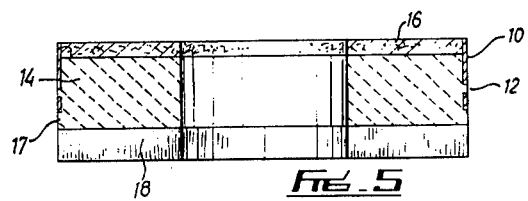
FIG. 5
FIG. 6
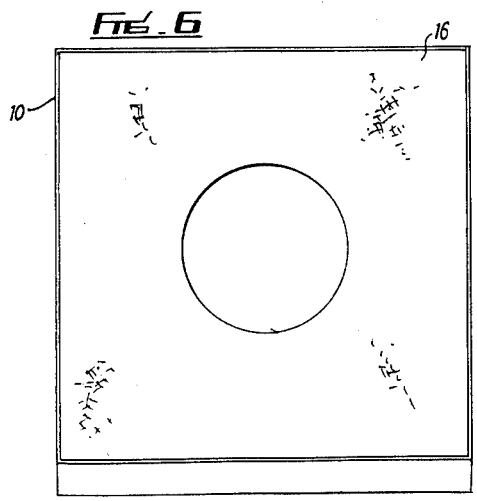

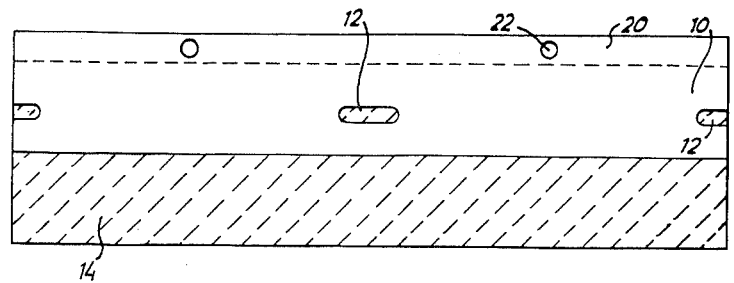
FIG. 7
FIG. 8
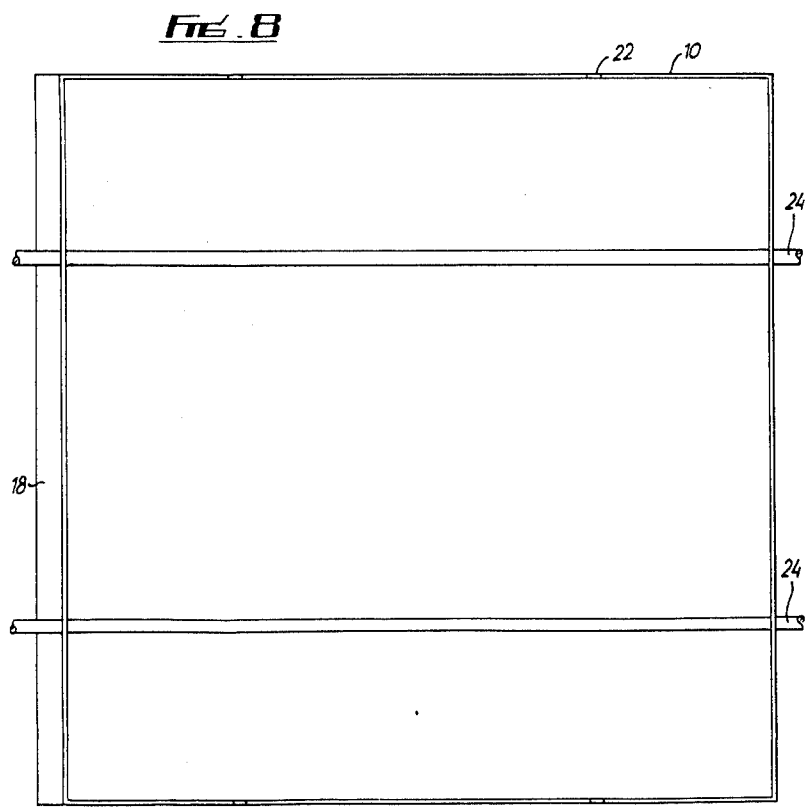

LININGS FOR FURNACES

The present invention concerns linings for furnaces, kilns or the like, hereinafter referred to as furnace linings.

It has been known in the past to line furnaces with ceramic fibre insulation. Normally such linings are provided by a blanket of fibres, the length of the blanket being greater than its width. In the manufacture of such blankets, the elongate fibres are arranged in a manner similar to that employed in felt, with the longitudinal axes of the fibres so far as the manufacturing technique allows predominately mutually parallel and parallel to the longitudinal axis of the blanket. For simplicity the orientation of the longitudinal axis of the blanket and hence the fibres will be referred to hereinafter as the "fibre orientation".

A further form of lining has involved cutting the fibrous blanket transversely into strips and arranging the strips in uncut face to uncut face relationship with the uncut faces arranged perpendicular to the furnace wall to be lined. This provides an exposed lining surface comprised of the ends of fibres.

Such arrangements have suffered from disadvantages for example, due to erosion thereof as a result of flame impingement, or due to the formation of gaps between strips due to shrinkage in use.

It is an object of the present invention to obviate or mitigate the disadvantages inherent in these prior arrangements.

According to the present invention there is provided a furnace lining comprising ceramic fibres the fibre orientation lying at an acute angle to the furnace wall to be lined such that the surface of the lining exposed to the furnace interior is formed substantially by fibre ends.

Preferably the lining is made up from a plurality of strips formed by making transverse cuts in an elongate blanket of felted ceramic fibres in which the fibre orientation is predominately parallel to the longitudinal axis of the blanket, the strips being arranged in uncut face to uncut face relationship.

Preferably the acute angle is 46°, alternatively it is 22½°.

Further according to the present invention there is provided a furnace wall module for use with other modules in forming a furnace, said module comprising a frame, a cast refractory material within said frame and a ceramic fibre lining, said lining comprising ceramic fibres the fibre orientation lying at an acute angle to the face of the cast refractory to which they are attached such that the exposed face of the lining is formed substantially by fibre ends.

The frame may be fabricated from sheet metal into an open rectangle surrounding the cast refractory material, may have holes formed therein to provide a key for the refractory material, may have at least one of its lateral edges covered with cast refractory material and may project from the cast refractory material and be provided with fixing holes in said projecting portions to facilitate interfitment of modules.

Preferably said modules are flat, alternatively they may be curved or may form angle pieces, so that furnaces of any desired shape can be manufactured using standard modules.

Preferably the module has a mineral wool covering on its face remote from the face carrying the ceramic fibre lining.

Preferably reinforcing is incorporated in the cast refractory.

Preferably the acute angle of the fibre orientation is 46°, the fibres are substantially parallel and the lining is made up from a plurality of strips formed by making transverse cuts in an elongate blanket of felted ceramic fibres in which the fibre orientation is predominately parallel to the longitudinal axis of the blanket, the strips being arranged in uncut face to uncut face relationship with the cut faces thereof against and remote from the surface of the cast refractory.

Further according to the present invention there is provided a method of lining a furnace comprising making transverse cuts in an elongate blanket of felted fibres in which the fibre orientation is predominately parallel to the longitudinal axis of the blanket, the angle of cuts being at an acute angle to the face of the blanket, and attaching a cut face of each strip to the furnace surface to be lined so that the strips are arranged in uncut face to uncut face relationship with a cut face thereof being exposed to the furnace interior.

Preferably the angle of cut is 46° or 22½°.

Embodiments of the present invention will now be described by way of example with reference to the accompanying drawings in which:

FIGS. 4 to 6 show front, sectional and end elevations of a modified panel;

FIG. 7 shows an end elevation of the module of FIG. 1 before the application of the ceramic fibre lining;

FIG. 8 shows a module and mounting means therefor;

Figure 2:
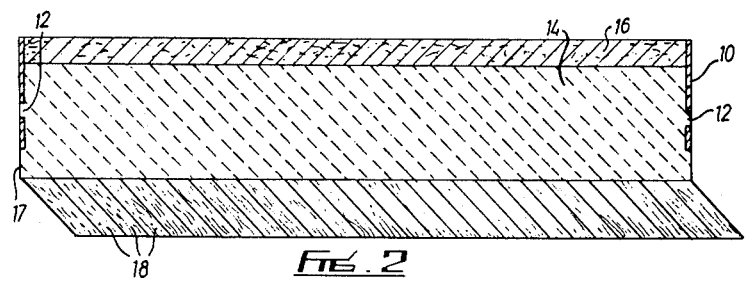
Figure 3:
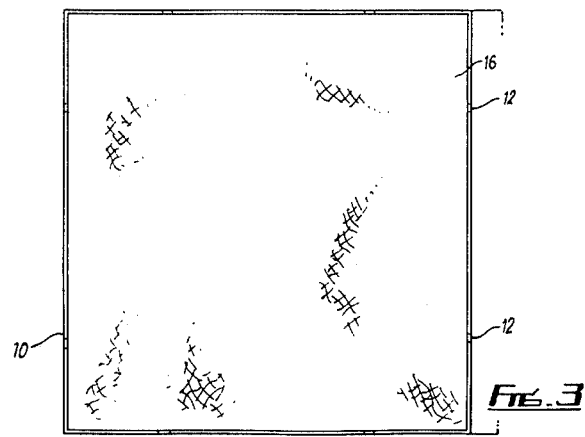

A furnace module comprises a sheet steel framework 10 fabricated as an open square (FIGS. 2 and 3). As can be seen from FIG. 2 holes 12 are provided in the sheet steel to provide keys for refractory material 14 which is cast into the framework. Before casting a mineral wool blanket 16 is placed in the framework to form the base of the module and the castable material is cast to a depth greater than the depth of the framework 10 such that it overlaps the framework as shown at 17 on FIG. 2.

A ceramic fibre insulating lining is attached to the inner face of the module using a suitable cement after the cast refractory 14 has set.

The lining is produced from an elongate blanket of felted ceramic fibres the fibre orientation being substantially parallel to the longitudinal axis of the blanket. Transverse strips are cut from the blanket, the angle of the cut being 46° to the face of the blanket and the strips, which each have the same width are designated by the reference numeral 18 are arranged in uncut face to uncut face relationship on the cast material with their faces substantially parallel and a cut face exposed as shown in FIGS. 1 and 2, such that the cut face is formed by fibre ends.

With this arrangement substantially all of the fibres lie with their axes generally at 46° to the front face of the cast refractory 14 of the module.

Figure 1:
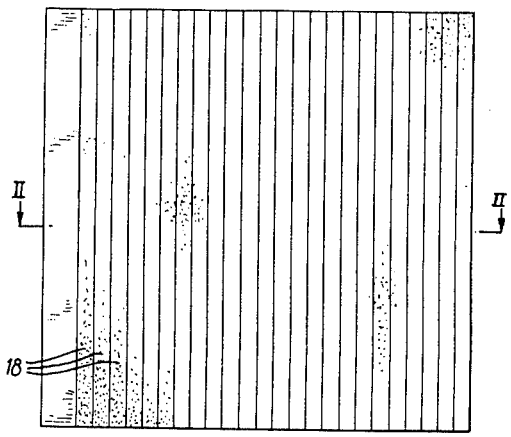
FIGS. 1 to 3 show respectively front, sectional and rear elevation of a ceramic fibre lined furnace module.

FIGS. 4 to 6 show a module similar to that illustrated in FIGS. 1 to 3 but incorporating a circular hole therethrough for accommodation of, for example, a burner assembly, the strips being arranged horizontally, rather than vertically as illustrated in FIGS. 1 to 3.

FIG. 7 shows a module before the ceramic fibre strips 18 are attached thereto and illustrates that the frame 10 may extend rearwardly of the panel to provide a projecting strip 20 having fixing holes 22 whereby a plurality of modules can be fixed together to form an entire furnace wall. One means for fixing a plurality of modules together is illustrated in FIG. 8 and comprises mounting rods 24 extending through the fixing holes 22. The rods may run vertically or horizontally.

Figure 9:
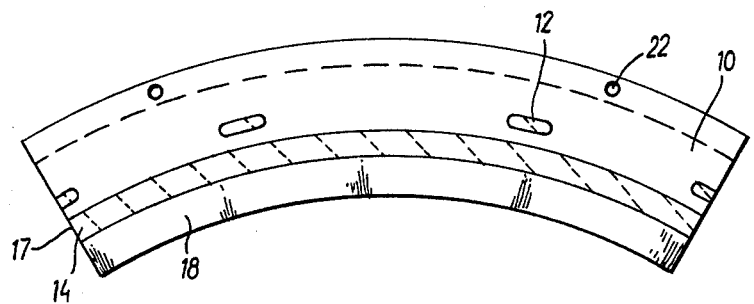
FIGS. 9 and 10 show respectively end and front elevations of an arcuate module.
Figure 10:
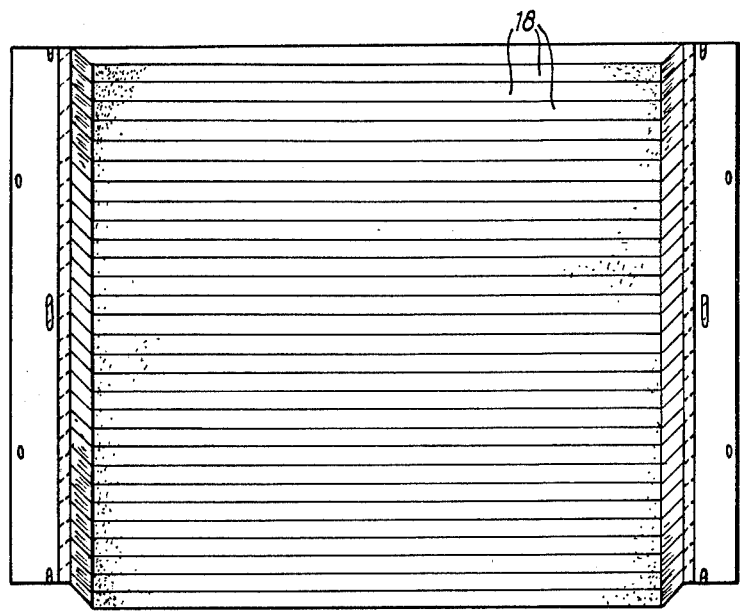

Such that the modules can be utilised to provide, for example, arched roof furnaces, the modified module shown in FIGS. 9 and 10 is arcuate. In this modification the furnace lining is formed from strips which have been cut at 22½° to the face of the blanket.

Figure 11:
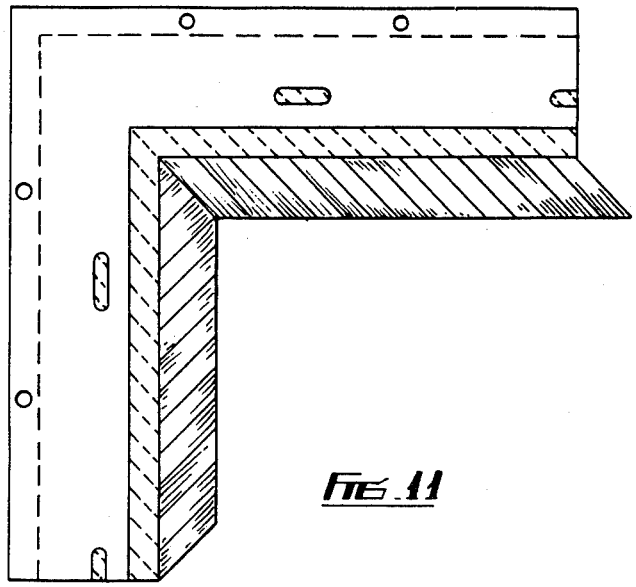
FIG. 11 shows an end elevation of a first form of corner module.
Figure 12:
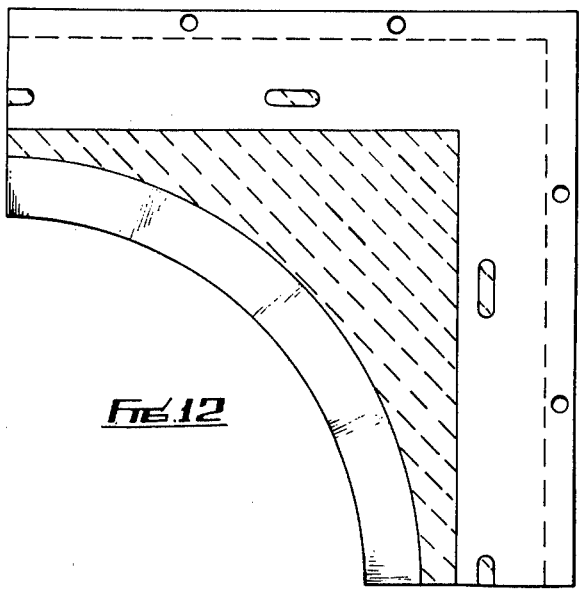
FIG. 12 shows an end elevation of a second form of corner module.

Furthermore, modules can be provided to form the corners of rectangular section kilns, such modules being shown in FIGS. 11 and 12. The embodiment illustrated in FIG. 11 provides a corner module for a furnace having a rectangular external and internal configuration whereas the module shown in FIG. 12 provides a corner module for a furnace having a rectangular external configuration and an arcuate internal configuration.

Various modifications can be made without departing from the scope of the invention, for example, other shapes of modules apart from rectangular could be provided, the reinforcing means for the cast refractory could be of a different form, the external insulating means could be dispensed with or substituted by some material other than mineral wool, the cast refractory material could be replaced for example by refractory blocks, or by a plurality of refractory bricks and the fibre strips could be cut at other convenient acute angles, preferably greater than 20°.

It will be realised that whereas the present invention has been described above with reference to the drawings in use as a lining for furnace modules it is equally applicable to the lining of entire furnace or parts thereof where once again strips of a felted ceramic fibre blanket similar to those strips illustrated in the drawings are arranged with the fibre orientation generally at 46° or 22½° to the face of the wall to which they are attached.

Use of strips cut from a felted elongate ceramic fibre blanket is most advantageous in that since the fibre ends only are exposed to the furnace interoir there is little chance of delamination of the fibres and consequent contamination of the furnace. Since the fibre orientation is at an angle to the furnace surface the strips can be arranged such that the fibres slope in the direction of flame impingement thereon, this also reducing the possibility of detachment of fibres from the blanket. Further when the strips line furnace modules or parts of a furnace it has been found that with fibre orientation perpendicular to the furnace wall due to shrinkage, gaps appear in the lining between modules or separately lined furnace areas, or even between individual strips, causing a severe breakdown in insulation. With the arrangements described above this problem is not evident as the strips overlap due to their angled disposition relative to the furnace wall.

In the embodiments described above the ends of the fibrous strips forming the lining are perpendicular to the face of the blanket from which they are cut and indeed in some cases as the length of a strip is equal to the width of the blanket the strip ends are formed by the blanket edges.

Thus in a module as described for example with reference to FIGS. 1 to 3 the two opposite edges of the lining formed by the strip ends are perpendicular to the refractory surface while the other opposite edges formed by the uncut faces of strips are respectively at an acute and an obtuse angle thereto.

In a modification the strip ends are cut at an acute angle, preferably of 46° but alternatively 22½° to the blanket face, that is in the longitudinal direction of the blanket such that all the lining edges, are angled and provide in both directions the overlapping joints described above. The ends of a strip may be cut parallel or complementary.

In some instances the edge to edge joint between the linings of adjacent modules may be enhanced by placing a thin smear of a suitable cement on the abutting lining edges.

I claim:

1. A furnace lining comprising ceramic fibres the fibre orientation lying at an acute angle to the furnace wall to be lined such that the surface of the lining exposed to the furnace interior is formed substantially by fibre ends.

2. A furnace lining as claimed in claim 1, made up from a plurality of strips formed by making transverse cuts in an elongate blanket of felted ceramic fibres in which the fibre orientation is predominately parallel to the longitudinal axis of the blanket, the strips being arranged in uncut face to uncut face relationship.

3. A furnace lining as claimed in claim 1, in which the acute angle is 46°.

4. A furnace lining as claimed in claim 1, in which the acute angle is 22½°.

5. A furnace wall module for use with other modules in forming a furnace, said module comprising a frame, a cast refractory material within said frame and a ceramic fibre lining, said lining comprising ceramic fibres the fibre orientation lying at an acute angle to the face of the cast refractory to which they are attached such that the exposed face of the lining is formed substantially by fibre ends.

6. A furnace wall module as claimed in claim 5, in which the frame is fabricated from sheet metal into an open rectangle surrounding the cast refractory material.

7. A furnace wall module as claimed in claim 5, in which the frame has holes formed therein to provide a key for the refractory material.

8. A furnace wall module as claimed in claim 5, in which the frame has at least one of its lateral edges covered with cast refractory material.

9. A furnace wall module as claimed in claim 5 in which the frame projects from the cast refractory material and is provided with fixing holes in said projecting portions to facilitate interfitment of modules.

10. A furnace wall module as claimed in claim 5 which is flat.

11. A furnace wall module as claimed in claim 5 which is curved.

12. A furnace wall module as claimed in claim 5 which forms an angle.

13. A furnace wall module as claimed in claim 5 having a mineral wool covering on its face remote from the face carrying the ceramic fibre lining.

14. A furnace wall module as claimed in claim 5 in which reinforcing is incorporated in the cast refractory.

15. A furnace wall module as claimed in claim 5 in which the acute angle of the fibre orientation is 46°, the fibres are substantially parallel and the lining is made up from a plurality of strips formed by making transverse cuts in an elongate blanket of felted ceramic fibres in which the fibre orientation is predominately parallel to the longitudinal axis of the blanket, the strips being arranged in uncut face to uncut face relationship with the cut faces thereof against and remote from the surface of the cast refractory.

16. A furnace wall module as claimed in claim 5, in which the acute angle of the fibre orientation is 22½°, the fibres are substantially parallel and the lining is made up from a plurality of strips formed by making transverse cuts in an elongate blanket of felted ceramic fibres in which the fibre orientation is predominately parallel to the longitudinal axis of the blanket, the strips being arranged in uncut face to uncut face relationship with the cut faces thereof against and remote from the surface of the cast refractory.

17. A furnace wall module as claimed in claim 15 in which all the edges of the lining lie at an angle to planes perpendicular to the surface to which the lining is attached.

18. A furnace wall module as claimed in claim 16, in which all the edges of the lining lie at an angle to planes perpendicular to the surface to which the lining is attached.

19. A method of lining a furnace comprising making transverse cuts in an elongate blanket of felted fibres in which the fibre orientation is predominately parallel to the longitudinal axis of the blanket, the angle of cuts being at an acute angle to the face of the blanket, and attaching a cut face of each thus formed strip to the furnace surface to be lined so that the strips are arranged in uncut face to uncut face relationship with a cut face thereof being exposed to the furnace interior.

20. A method as claimed in claim 18, in which the angle of cut is 46°.

21. A method as claimed in claim 18, in which the angle of cut is 22½°.

22. A method as claimed in claim 18 in which ends of each strip are cut at an angle to the cut faces thereof.

23. A method as claimed in claim 22, in which the angle is 46°.

24. A method as claimed in claim 23, in which the angle is 22½°.

25. A method of lining a furnace comprising forming strips by making longitudinal cuts in an elongate blanket of felted fibres in which the fibre orientation is predominately parallel to the longitudinal axis of the blanket, the angle of cuts being at an acute angle to the face of the blanket and attaching a face of each strip to the furnace surface to be lined.

* * * * *